(12) United States Patent
Venkataraman et al.

(10) Patent No.: US 11,985,539 B2
(45) Date of Patent: May 14, 2024

(54) BUFFER STATUS REPORT (BSR) DATA REPORTING BASED ON APPLICATION PROCESSOR (AP) ASSISTANCE

(71) Applicant: Apple Inc., Cupertino, CA (US)

(72) Inventors: Vijay Venkataraman, San Jose, CA (US); Martin Kugler, Poing (DE); Ralf Itjeshorst, Walperskirchen (DE); Ahmed Salem, Ottobrunn (DE); Murtaza Shikari, Mountain View, CA (US); Srinivasan Nimmala, San Jose, CA (US); Tong Liu, San Diego, CA (US); Cahya A. Masputra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 164 days.

(21) Appl. No.: 17/390,822

(22) Filed: Jul. 30, 2021

(65) Prior Publication Data

US 2023/0030013 A1 Feb. 2, 2023

(51) Int. Cl.
*H04W 28/02* (2009.01)
*H04W 84/04* (2009.01)

(52) U.S. Cl.
CPC ... *H04W 28/0278* (2013.01); *H04W 28/0252* (2013.01); *H04W 28/0268* (2013.01); *H04W 84/042* (2013.01)

(58) Field of Classification Search
CPC ......... H04W 28/0278; H04W 28/0252; H04W 28/0268; H04W 84/042
See application file for complete search history.

(56) References Cited

U.S. PATENT DOCUMENTS

| | | | |
|---|---|---|---|
| 2019/0124546 A1* | 4/2019 | Phuyal | H04W 72/21 |
| 2019/0166640 A1* | 5/2019 | Wei | H04W 72/52 |
| 2020/0065161 A1* | 2/2020 | Sanghi | G06F 9/542 |

* cited by examiner

Primary Examiner — Ronald Eisner
(74) Attorney, Agent, or Firm — Fish & Richardson P.C.

(57) ABSTRACT

Embodiments may relate to identifying, by a baseband processor, an amount of data in a data radio bearer (DRB) buffer of the baseband processor. Embodiments further relate to determining, by the baseband processor based on an indication from an application processor of the electronic device, an amount of data in at least one buffer of the application processor. Embodiments further relate to generating, by the baseband processor based at least in part on the amount of data in the DRB buffer and the amount of data in the at least one buffer of the application processor, a buffer status report (BSR). Other embodiments may be described or claimed.

20 Claims, 10 Drawing Sheets

BUFFER STATUS REPORT (BSR) DATA REPORTING BASED ON APPLICATION PROCESSOR (AP) ASSISTANCE

BACKGROUND

In cellular transmissions such as fifth generation (5G) transmissions, medium access control (MAC) buffer status report (BSR) reporting may occur.

DETAILED DESCRIPTION

Figure 1:
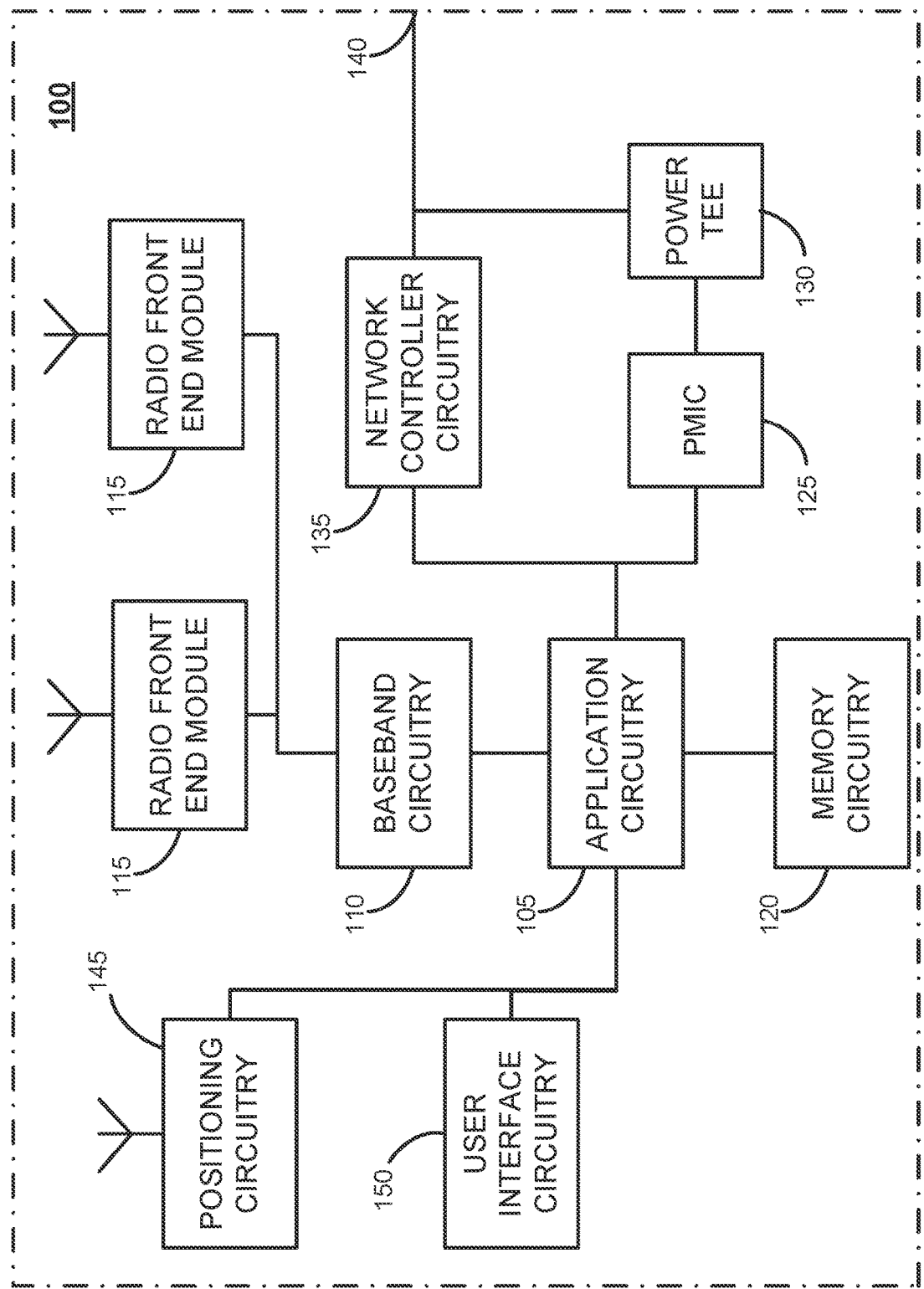
FIG. 1 illustrates an example of an electronic device, in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are directly communicatively coupled with one another such that they are able to exchange electrical (e.g., data) signals between one another. Additionally or alternatively, two items may be communicatively coupled with one or more intervening elements (e.g., switches, processors, routing elements, buffers, etc.) positioned in the communication line between the two elements.

Various operations may be described as multiple discrete operations in turn, in a manner that is most helpful in understanding the claimed subject matter. However, the order of description should not be construed as to imply that these operations are necessarily order dependent.

As noted, in cellular communications such as 5G communications, MAC BSR reporting may occur. In some embodiments, the BSR reporting may occur for respective logical channel groups (LCGs) of an uplink (UL) transmission. Each LCG may have one or more data radio bearers (DRBs) associated with it.

Generally, the terms LCG, DRB, and BSR are used consistently with their descriptions and definitions as stated in the third generation partnership project (3GPP) specifications. At a high level, as used herein, a LCG refers to a group of logical channels being used in a UL transmission. A DRB can refer to a data structure within an LCG. More specifically, a DRB refers to a logical structure of data in a wireless UL transmission between a user equipment (UE) and another device such as an eNodeB (eNB) or an access node (AN) of a wireless network. The DRB may include data or packets from one or more internet protocol (IP) flows of the UE. An IP flow may be defined as all packets belonging to the same five tuple (e.g., having the same source and destination IP address, the same source and destination port number, and the same level 4 (L4) protocol).

A BSR can refer to a report that is generated to describe the status of buffers (which may also be referred to as "queues") which are storing data related to one or more LCGs. In one embodiment, a BSR can report data only for a single LCG. In another embodiment, a BSR can report data for a plurality of LCGs.

Typically, in such communications, data may be passed from an AP, also referred to herein as "application circuitry") to a baseband processor ("BB processor," also referred to herein as baseband circuitry), which then processes the data for transmission. In order to appropriately process the data, both the AP and the BB processor may have one or more buffers in which data is stored for processing by the AP and/or BB processor. In embodiments, it may be more efficient for the buffers in the BB processor to be relatively small to prevent head-of-line blocking (e.g., queueing a large number of packets in a single buffer which are then not transmitted due to the first packet in the buffer not being transmitted). Therefore, it may be desirable for a large amount of the data to be buffered in buffers of the AP. Once the UE receives a grant of UL transmission resources, the queued data is then offloaded from the AP to the BB processor for processing and transmission.

In legacy BSR reporting, only the pending data present in buffers of the BB processor are typically considered in generating the BSR. However, this technique of BSR reporting may not accurately describe the amount of UL data that is actually pending at the UE, because it may not take into account the data in the buffers of the AP. Therefore, the system may not receive an appropriate number of UL resources for data transmission due to under-reporting.

Embodiments herein relate to a technique for resolving the above-described under-reporting problem. Specifically, embodiments relate to techniques of BSR report generation and reporting that accounts for data in buffers of the AP. For example, baseband circuitry such as baseband circuitry 110 or 210 (described in further detail below) may identify an amount of data in one or more of buffers of the baseband circuitry. The baseband circuitry may further identify an amount of data in one or more buffers of application circuitry such as application circuitry 105 or 205 (described in further detail below). Based on the identified data, the baseband processor may generate a BSR that includes an indication of the total amount of data in the one or more buffers of the baseband circuitry and the one or more buffers of the application circuitry. In some embodiments, identification of the data or generation of the BSR may be based on instructions stored in one or more of the baseband circuitry, application circuitry, and memory circuitry such as memory circuitry 120 or 220 (described in further detail below).

FIG. 1 illustrates an example of an electronic device 100, in accordance with various embodiments. In embodiments, the electronic device 100 may be, include, be a part of, be included in, or otherwise be related to a UE. In another embodiment, the electronic device 100 may be implemented as a base station, radio head, RAN node, application server, and/or any other element/device discussed herein.

The electronic device 100 includes application circuitry 105, baseband circuitry 110, one or more radio front end modules (RFEMs) 115, memory circuitry 120, power management integrated circuitry (PMIC) 125, power tee circuitry 130, network controller circuitry 135, network interface connector 140, satellite positioning circuitry 145, and user interface 150. In some embodiments, the electronic device 100 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 105 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 105 may be coupled with or may include memory/storage elements and may be configured to execute instructions stored in the memory/storage to enable various applications or operating systems to run on the electronic device 100. In some implementations, the memory/storage elements may be on-chip memory circuitry, which may include any suitable volatile and/or nonvolatile memory, such as dynamic random access memory (DRAM), static random access memory (SRAM), erasable programmable read-only memory (EPROM), electrically erasable programmable read-only memory (EEPROM), flash memory, solid-state memory, and/or any other type of memory device technology, such as those discussed herein.

The processor(s) of application circuitry 105 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 105 may comprise, or may be, a special-purpose processor/controller to operate according to the various embodiments herein. As examples, the processor(s) of application circuitry 105 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. Such as the ARM Cortex-A family of processors and the ThunderX2® provided by Cavium™, Inc.; a MIPS-based design from MIPS Technologies, Inc., such as MIPS Warrior P-class processors; and/or the like. In some embodiments, the electronic device 100 may not utilize application circuitry 105, and instead may include a special-purpose processor/controller to process IP data received from an EPC or 5GC, for example.

In some implementations, the application circuitry 105 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 105 may comprise logic blocks or logic fabric, and other interconnected resources that may be programmed to perform various functions, such as the procedures, methods, functions, etc. of the various embodiments discussed herein. In such embodiments, the circuitry of application circuitry 105 may include memory cells (e.g., EPROM, EEPROM, flash memory, static memory (e.g., SRAM, anti-fuses, etc.)) used to store logic blocks, logic fabric, data, etc. in look-up-tables (LUTs) and the like.

The baseband circuitry 110 may be implemented, for example, as a solder-down substrate including one or more integrated circuits, a single packaged integrated circuit soldered to a main circuit board or a multi-chip module containing two or more integrated circuits.

User interface circuitry 150 may include one or more user interfaces designed to enable user interaction with the electronic device 100 or peripheral component interfaces designed to enable peripheral component interaction with the electronic device 100. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a USB port, an audio jack, a power supply interface, etc.

The RFEMs 115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 115, which incorporates both mmWave antennas and sub-mmWave.

The memory circuitry 120 may include one or more of volatile memory including DRAM and/or synchronous DRAM (SDRAM), and nonvolatile memory (NVM) including high-speed electrically erasable memory (commonly referred to as flash memory), phase change random access memory (PRAM), magnetoresistive random access memory (MRAM), etc., and may incorporate the three-dimensional (3D) cross-point (XPOINT) memories from Intel® and Micron®. Memory circuitry 120 may be implemented as one or more of solder-down packaged integrated circuits, socketed memory modules and plug-in memory cards.

The PMIC 125 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 130 may provide for electrical power drawn from a network cable to provide both power supply and data connectivity to the electronic device 100 using a single cable.

The network controller circuitry 135 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the electronic device 100 via network interface connector 140 using a physical connection, which may be electrical (commonly referred to as a "copper interconnect"), optical, or wireless. The network controller circuitry 135 may include one or more dedicated processors and/or FPGAs to communicate using one or more of the aforementioned protocols. In some implementations, the network controller circuitry 135 may include multiple controllers to provide connectivity to other networks using the same or different protocols.

The positioning circuitry 145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 145 may include a Micro-Technology for Positioning, Navigation, and Timing (Micro-PNT) integrated circuits (IC) that uses a master timing clock to perform position tracking/estimation without GNSS assistance. The positioning circuitry 145 may also be part of, or interact with, the baseband circuitry 110 and/or RFEMs 115 to communicate with the nodes and components of the positioning network. The positioning circuitry 145 may also provide position data and/or time data to the application circuitry 105, which may use the data to synchronize operations with various infrastructure (e.g., RAN nodes XQ11, etc.), or the like.

The components shown by FIG. 1 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a system on a chip (SoC) based system. Other bus/IX systems may be included, such as an I2C interface, an SPI interface, point-to-point interfaces, and a power bus, among others.

Figure 2:
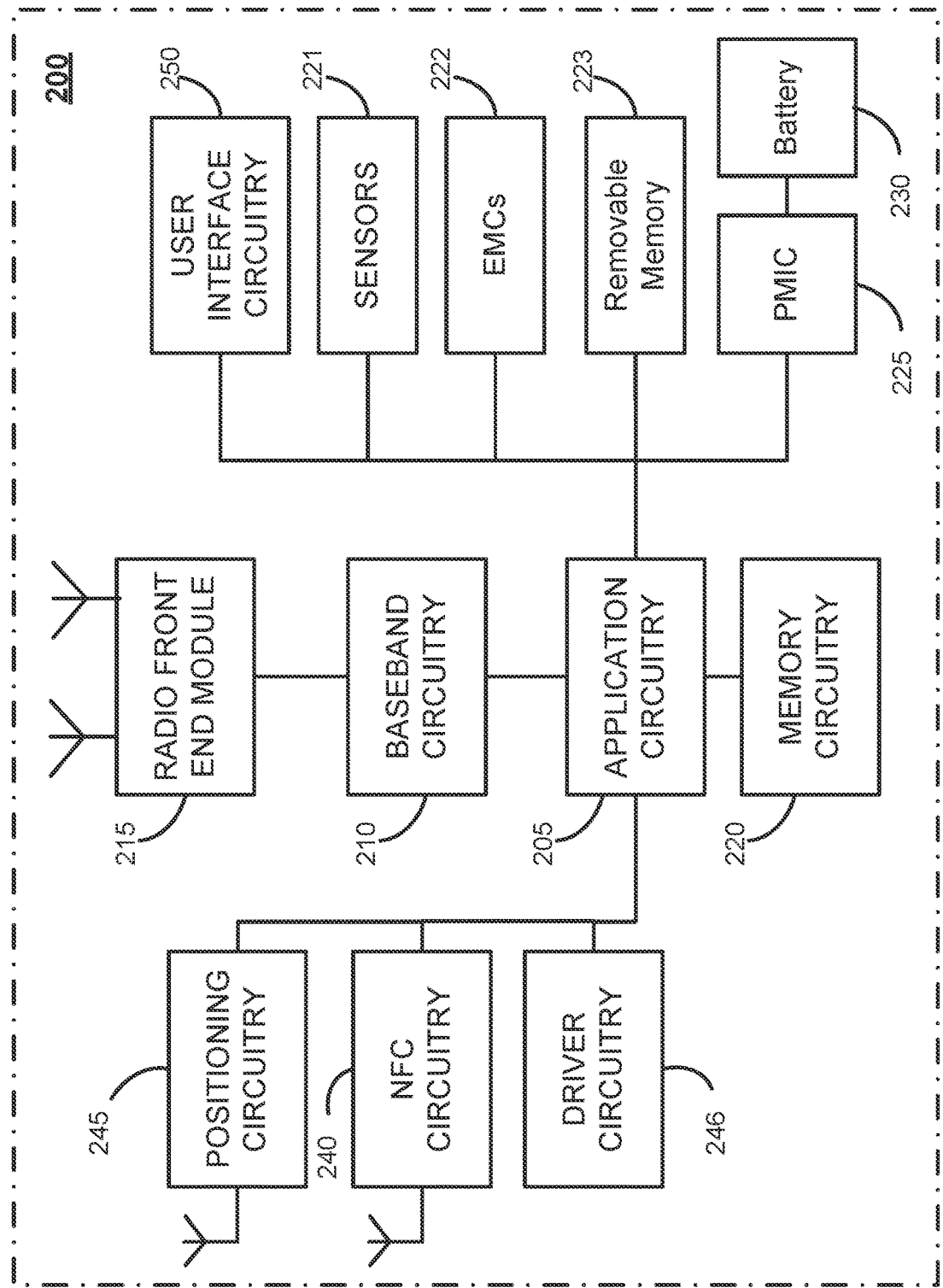
FIG. 2 illustrates an alternative example of an electronic device, in accordance with various embodiments.

FIG. 2 illustrates an example of an electronic device 200 in accordance with various embodiments. Specifically, FIG. 2 depicts an electronic device 200 with a different configuration that includes several elements similar to those of electronic device 100. In embodiments, the electronic device 200 may be suitable for use as a UE, while in other embodiments the electronic device 200 may be suitable for use as a base station, and access point, an application server, and/or any other element/device discussed herein. The electronic device 200 may include any combinations of the components shown in the example. The components of electronic device 200 may be implemented as ICs, portions thereof, discrete electronic devices, or other modules, logic, hardware, software, firmware, or a combination thereof adapted in the electronic device 200, or as components otherwise incorporated within a chassis of a larger system. The block diagram of FIG. 2 is intended to show a high level view of components of the electronic device 200. However, some of the components shown may be omitted, additional components may be present, and different arrangement of the components shown may occur in other implementations.

Application circuitry 205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 205 may be coupled with or may include memory/storage elements and may be configured to execute instructions stored in the memory/storage to enable various applications or operating systems to run on the electronic device 200. In some implementations, the memory/storage elements may be on-chip memory circuitry, which may include any suitable volatile and/or nonvolatile memory, such as DRAM, SRAM, EPROM, EEPROM, flash memory, solid-state memory, and/or any other type of memory device technology, such as those discussed herein.

The processor(s) of application circuitry 205 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 205 may comprise, or may be, a special-purpose processor/controller to operate according to the various embodiments herein.

As examples, the processor(s) of application circuitry 205 may include an Apple A-series processor. The processors of the application circuitry 205 may also be one or more of an Intel® Architecture Core™ based processor, such as a Quark™, an Atom™, an i3, an i5, an i7, or an MCU-class processor, or another such processor available from Intel® Corporation, Santa Clara, CA; AMD Ryzen® processor(s) or APUs; Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 205 may be a part of a SoC in which the application circuitry 205 and other components are formed into a single integrated circuit.

Additionally or alternatively, application circuitry 205 may include circuitry such as, but not limited to, one or more a FPDs such as FPGAs and the like; PLDs such as complex PLDs (CPLDs), high-capacity PLDs (HCPLDs), and the like; ASICs such as structured ASICs and the like; programmable SoCs (PSoCs); and the like. In such embodiments, the circuitry of application circuitry 205 may comprise logic blocks or logic fabric, and other interconnected resources that may be programmed to perform various functions, such as the procedures, methods, functions, etc. of the various embodiments discussed herein. In such embodiments, the circuitry of application circuitry 205 may include memory cells (e.g., EPROM, EEPROM, flash memory, static memory (e.g., SRAM, anti-fuses, etc.)) used to store logic blocks, logic fabric, data, etc. in LUTs and the like.

The baseband circuitry 210 may be implemented, for example, as a solder-down substrate including one or more IC, a single packaged integrated circuit soldered to a main circuit board or a multi-chip module containing two or more IC.

The RFEMs 215 may comprise a millimeter wave (mmWave) RFEM and one or more sub-mmWave RFICs. In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 215, which incorporates both mmWave antennas and sub-mmWave.

The memory circuitry 220 may include any number and type of memory devices used to provide for a given amount of system memory. As examples, the memory circuitry 220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as flash memory), PRAM, MRAM, etc. The memory circuitry 220 may be developed in accordance with a Joint Electron Devices Engineering Council (JEDEC) low power double data rate (LPDDR)-based design, such as LPDDR2, LPDDR3, LPDDR4, or the like. Memory circuitry 220 may be implemented as one or more of solder-down packaged IC, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 220 may be on-die memory or registers associated with the application circuitry 205. To provide for persistent storage of information such as data, applications, operating systems and so forth, memory circuitry 220 may include one or more mass storage devices, which may include, inter alia, a solid-state disk drive (SSDD), hard disk drive (HDD), a micro HDD, resistance change memories, phase change memories, holographic memories, or chemical memories, among others. For example, the electronic device 200 may incorporate the three-dimensional (3D) cross-point (XPOINT) memories from Intel® and Micron®.

Removable memory circuitry 223 may include devices, circuitry, enclosures/housings, ports or receptacles, etc. Used to couple portable data storage devices with the electronic device 200. These portable data storage devices may be used for mass storage purposes, and may include, for example, flash memory cards (e.g., SD cards, microSD cards, xD picture cards, and the like), and USB flash drives, optical discs, external HDDs, and the like.

The electronic device 200 may also include interface circuitry (not shown) that is used to connect external devices with the electronic device 200. The external devices connected to the electronic device 200 via the interface circuitry include sensor circuitry 221 and electro-mechanical components (EMCs) 222, as well as removable memory devices coupled to removable memory circuitry 223.

The sensor circuitry 221 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 222 include devices, modules, or subsystems whose purpose is to enable electronic device 200 to change its state, position, and/or orientation, or move or control a mechanism or (sub)system. Additionally, EMCs 222 may be configured to generate and send messages/signaling to other components of the electronic device 200 to indicate a current state of the EMCs 222. Examples of the EMCs 222 include one or more power switches, relays including electro-mechanical relays (EMRs) and/or solid-state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like EMCs. In embodiments, electronic device 200 is configured to operate one or more EMCs 222 based on one or more captured events and/or instructions or control signals received from a service provider and/or various clients.

In some implementations, the interface circuitry may connect the electronic device 200 with positioning circuitry 245. The positioning circuitry 245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 245 may include a Micro-PNT IC that uses a master timing clock to perform position tracking/estimation without GNSS assistance. The positioning circuitry 245 may also be part of, or interact with, the baseband circuitry 110 and/or RFEMs 215 to communicate with the nodes and components of the positioning network. The positioning circuitry 245 may also provide position data and/or time data to the application circuitry 205, which may use the data to synchronize operations with various infrastructure (e.g., radio base stations), for turn-by-turn navigation applications, or the like In some implementations, the interface circuitry may connect the electronic device 200 with Near-Field Communication (NFC) circuitry 240. NFC circuitry 240 is configured to provide contactless, short-range communications based on radio frequency identification (RFID) standards, wherein magnetic field induction is used to enable communication between NFC circuitry 240 and NFC-enabled devices external to the electronic device 200 (e.g., an "NFC touchpoint"). NFC circuitry 240 comprises an NFC controller coupled with an antenna element and a processor coupled with the NFC controller. The NFC controller may be a chip/IC providing NFC functionalities to the NFC circuitry 240 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 240, or initiate data transfer between the NFC circuitry 240 and another active NFC device (e.g., a smartphone or an NFC-enabled POS terminal) that is proximate to the electronic device 200.

The driver circuitry 246 may include software and hardware elements that operate to control particular devices that are embedded in the electronic device 200, attached to the electronic device 200, or otherwise communicatively coupled with the electronic device 200. The driver circuitry 246 may include individual drivers allowing other components of the electronic device 200 to interact with or control various input/output (I/O) devices that may be present within, or connected to, the electronic device 200. For example, driver circuitry 246 may include a display driver to control and allow access to a display device, a touchscreen driver to control and allow access to a touchscreen interface of the electronic device 200, sensor drivers to obtain sensor readings of sensor circuitry 221 and control and allow access to sensor circuitry 221, EMC drivers to obtain actuator positions of the EMCs 222 and/or control and allow access to the EMCs 222, a camera driver to control and allow access to an embedded image capture device, audio drivers to control and allow access to one or more audio devices.

The power management integrated circuitry (PMIC) 225 (also referred to as "power management circuitry 225") may manage power provided to various components of the electronic device 200. In particular, with respect to the baseband circuitry 210, the PMIC 225 may control power-source selection, voltage scaling, battery charging, or DC-to-DC conversion. The PMIC 225 may often be included when the electronic device 200 is capable of being powered by a battery 230, for example, when the device is included in a UE XQ01, XR101, XR201.

In some embodiments, the PMIC 225 may control, or otherwise be part of, various power saving mechanisms of the electronic device 200. For example, if the electronic device 200 is in an RRC_Connected state, where it is still connected to the RAN node as it expects to receive traffic shortly, then it may enter a state known as Discontinuous Reception Mode (DRX) after a period of inactivity. During this state, the electronic device 200 may power down for brief intervals of time and thus save power. If there is no data traffic activity for an extended period of time, then the electronic device 200 may transition off to an RRC_Idle state, where it disconnects from the network and does not perform operations such as channel quality feedback, handover, etc. The electronic device 200 goes into a very low power state and it performs paging where again it periodically wakes up to listen to the network and then powers down again. The electronic device 200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 230 may power the electronic device 200, although in some examples the electronic device 200 may be mounted deployed in a fixed location, and may have a power supply coupled to an electrical grid. The battery 230 may be a lithium ion battery, a metal-air battery, such as a zinc-air battery, an aluminum-air battery, a lithium-air battery, and the like. In some implementations, such as in V2X applications, the battery 230 may be a typical lead-acid automotive battery.

In some implementations, the battery 230 may be a "smart battery," which includes or is coupled with a Battery Management System (BMS) or battery monitoring integrated circuitry. The BMS may be included in the electronic device 200 to track the state of charge (SoCh) of the battery 230. The BMS may be used to monitor other parameters of the battery 230 to provide failure predictions, such as the state of health (SoH) and the state of function (SoF) of the battery 230. The BMS may communicate the information of the battery 230 to the application circuitry 205 or other components of the electronic device 200. The BMS may also include an analog-to-digital (ADC) convertor that allows the application circuitry 205 to directly monitor the voltage of the battery 230 or the current flow from the battery 230. The battery parameters may be used to determine actions that the electronic device 200 may perform, such as transmission frequency, network operation, sensing frequency, and the like.

A power block, or other power supply coupled to an electrical grid may be coupled with the BMS to charge the battery 230. In some examples, the power block XS30 may be replaced with a wireless power receiver to obtain the power wirelessly, for example, through a loop antenna in the computer electronic device 200. In these examples, a wireless battery charging circuit may be included in the BMS. The specific charging circuits chosen may depend on the size of the battery 230, and thus, the current required.

User interface circuitry 250 includes various input/output (I/O) devices present within, or connected to, the electronic device 200, and includes one or more user interfaces designed to enable user interaction with the electronic device 200 and/or peripheral component interfaces designed to enable peripheral component interaction with the electronic device 200. The user interface circuitry 250 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the electronic device 200. The output device circuitry may also include speakers or other audio emitting devices, printer(s), and/or the like. In some embodiments, the sensor circuitry 221 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a nonvolatile memory port, a USB port, an audio jack, a power supply interface, etc.

Although not shown, the components of electronic device 200 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 3:
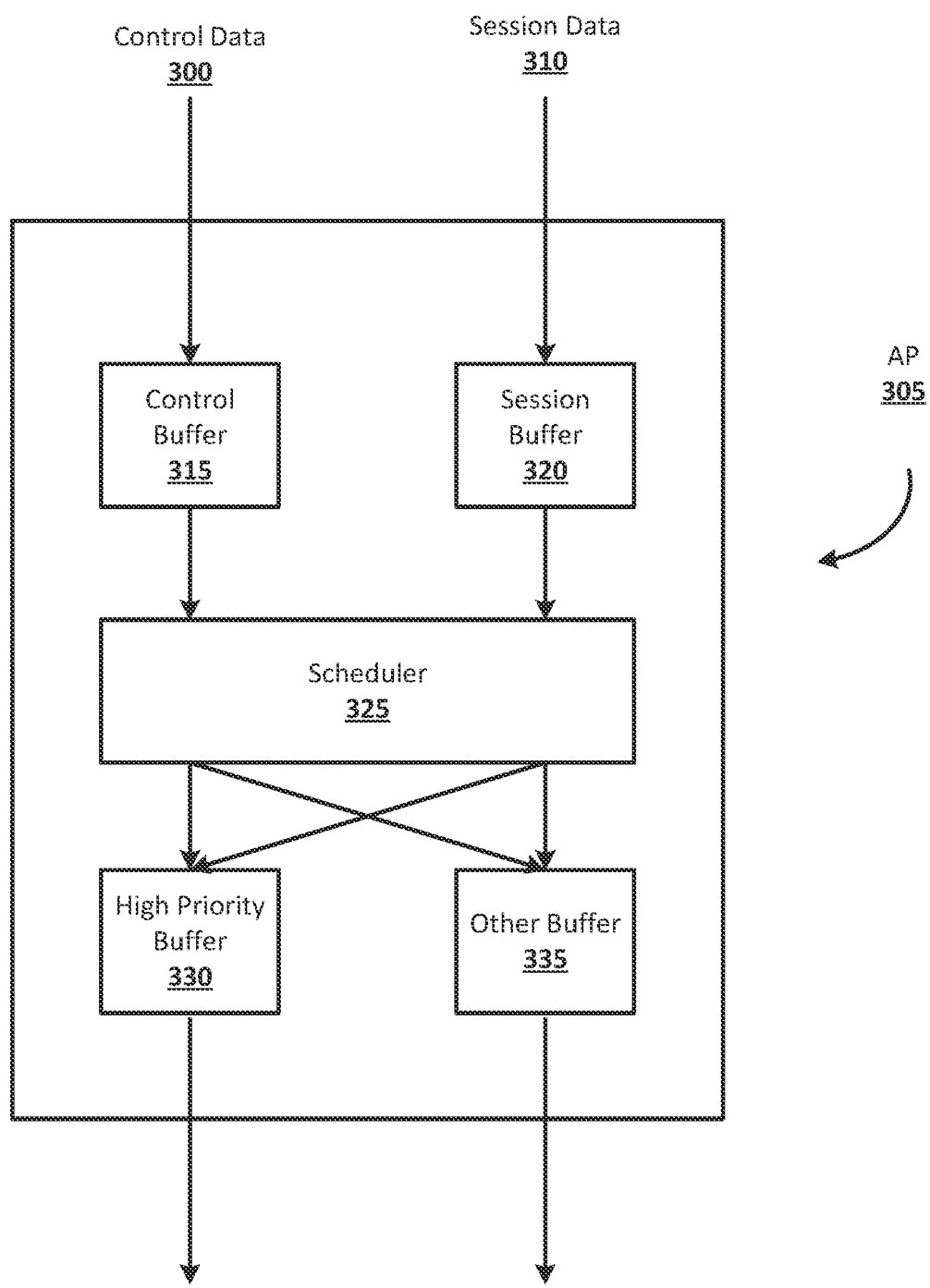
FIG. 3 illustrates a high level block diagram of an application processor (AP), in accordance with various embodiments.

FIG. 3 illustrates a high level block diagram of an AP 305, in accordance with various embodiments. The AP 305 may be similar to or represent one example of, and share one or more characteristics with, application circuitry 105 or 205 as described above.

The AP 305 may receive data from an IP flow such as control data 300 and session data 310, for example from various other elements or circuitry of the electronic devices 100 or 200 as described above. The control data 300 may include data that is related to control plane elements of the UE such as transmission control protocol (TCP) acknowledgement, internet protocol (IP) multimedia subsystem (IMS) session initiation protocol (SIP) signaling, etc. The session data 310 may include data or information related to one or more processes or programs of the UE or the wireless system in general. Such data can include, for example, TCP or user datagram protocol (UDP) data, or some other regular application-originated IP data.

The AP 305 includes a control buffer 315 that is configured to store the control data 300 for processing by the AP 305. The AP 305 further includes a session buffer 320 which is configured to store the session data 310 for processing by the AP 305. In embodiments the control buffer 315 and/or session buffer 320 (and/or other buffers herein) may be configured as a first-in-first-out (FIFO) buffer, a last-in-first-out (LIFO) buffer, or some other type of buffer.

The AP 305 may further include a scheduler 325. The scheduler 325 may be configured to receive stored control data 300 from the control buffer 315 and stored session data 310 from the session buffer 320. The scheduler 325 may further be coupled with one or more buffers such as a high-priority buffer 330 and one or more other buffers 335. The scheduler 325 may sort the received control data and session data into the high-priority buffer 330 and the other buffer 335. Such a sorting may be based on, for example, the type of DRB with which the data is associated, metadata of the control or session data (e.g., a service_class descriptor, a unique hash identifier, a time to live (TTL) value, a pending_data field, or some other metadata element). In general, data that is identified as having a higher priority is placed into the high-priority buffer 330 for prioritized transmission from the AP 305 to a BB processor. Data that is not identified as having the higher priority is placed into the other buffer(s) 335 for lower priority transmission.

Figure 4:
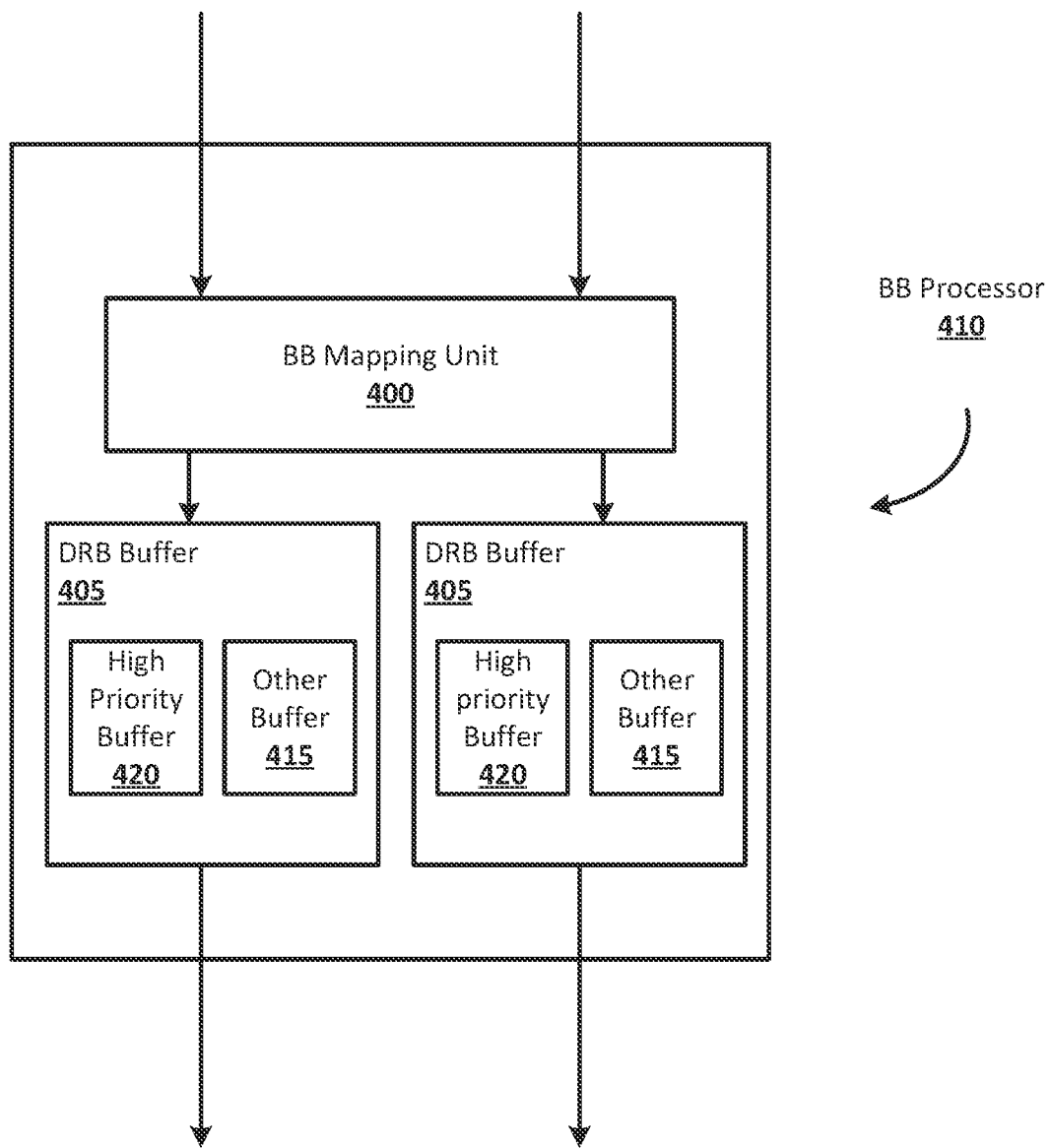
FIG. 4 illustrates a high level block diagram of a baseband processor, in accordance with various embodiments.

The queued data is then output from the AP 305 to a BB processor. FIG. 4 illustrates a high level block diagram of a BB processor 410, in accordance with various embodiments. The BB processor 410 may be similar to or represent an example of, for example, BB circuitry 110 or 210 described above.

The BB processor 410 may include a BB mapping unit 400 that is configured to receive the data from the buffers 330/335 and map the data to DRB buffers 405. A DRB buffer 405 may be a buffer that is related to a specific DRB of an LCG. The BB mapping unit 400 may identify that data is to be sorted into a respect DRB buffer 405 based on parameters such as a service data flow (SDF) identifier, QFI, a DRB identifier, or some other parameter. Respective ones of the DRB buffers 405 may include a high-priority buffer 420 and one or more other buffers 415, which may be respectively similar to the buffers 330 and 335 described above.

It will be understood that the architecture depicted in FIGS. 3 and 4 is intended as a high level example for the sake of discussion herein. Real world embodiments of a UE that includes an AP 305 and a BB processor 410 may include more or fewer buffers, more elements within the data flow, or other variations.

As noted, it may be desirable for a BSR to be comprehensively generated that accurately describes data in the buffers of both the AP (e.g., AP 305) and the BB processor (e.g., BB processor 410). For example, it may be desirable to generate a BSR that includes an accurate representation of data in buffers 315, 320, 330, and 335 in addition to buffers 405. Embodiments herein relate to different techniques by which such a BSR may be generated.

One such option for generating a BSR as described above is through the use of a hash such as a Jenkins hash function. A Jenkins hash function may refer to a cryptographic value that is generated which may serve as an identifier of a given LCG or DRB through the process flow of the data from the AP 305 to the BB processor 410.

Specifically, in this embodiment, it may have been difficult to identify which data in the AP 305 was related to a given LCG. Therefore, in this embodiment a hash value may be computed by the AP 305 for a given IP flow. The hash value may be used by the AP 305 and the BB processor 410 to track a given IP flow as the packets progress through the UE.

In one embodiment, the BB processor 410 may send a request to the AP 305, for example through an in-band command (e.g., a command that is sent within the data connection between the BB processor 410 and the AP 305). In some embodiments, the request may be periodic (e.g., occurring every 10 milliseconds (ms) or in accordance with some other time period based on factors such as total system bandwidth or resource availability), while in other embodiments the request may be non-periodic. Responsive to the request, the AP 305 may provide one or more indications of a hash value related to a given IP flow, DRB, QFI, or LCG, as well as the amount of data in one or more buffers of the AP related to that IP flow, DRB, QFI, or LCG. Such an indication may be provided through in-band communication. In another embodiment, the AP may be configured to provide the indication of the hash value(s) and data without receiving a request for the data from the BB processor, or based on a request from another processor or entity such as a network controller.

It will be understood that the communication herein is described as including in-band communication. Such communication may be desirable, because it may be faster than utilizing out-of-band communication such as a control plane path. Additionally, the in-band communication may be directly communicated from the networking stack (where the AP is logically located) to the BB processor. However, in other embodiments a different type of communication (e.g., a form of out-of-band communication) may be additionally or alternatively used.

As previously noted, in various embodiments a hash may be related to an IP flow, a DRB, a QFI, or an LCG. In some embodiments, the BB processor may be configured to associate an IP flow with another data structure such as a DRB or LCG, for example through a look-up table or some other table, such that the BB processor may be configured to identify data for a given DRB or LCG based on an indication of an IP flow with which that DRB or LCG is associated.

Figure 5:
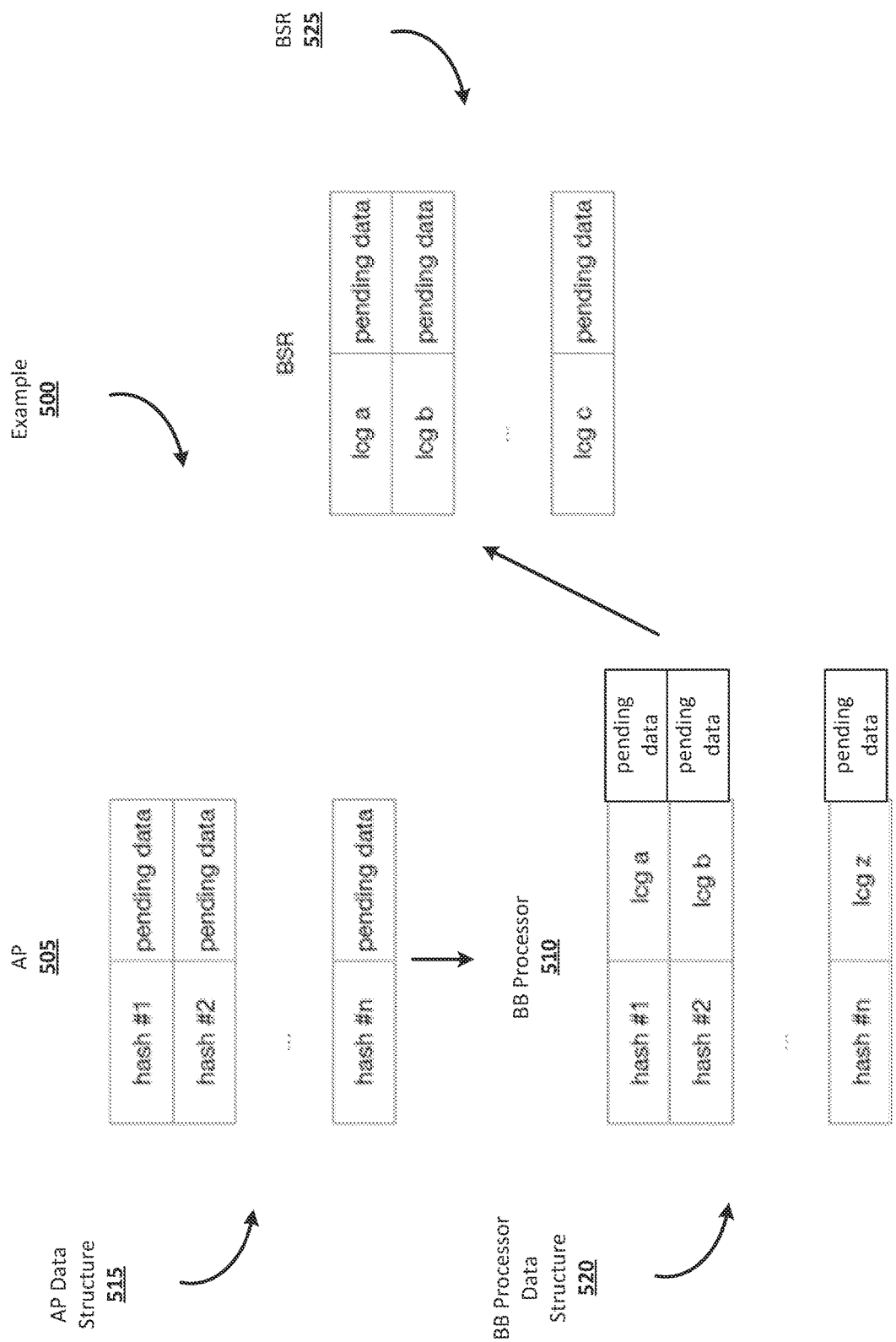
FIG. 5 illustrates an example of usage of a hash value, in accordance with various embodiments.

FIG. 5 illustrates an example 500 of usage of a hash value, in accordance with various embodiments. It will be understood that the example 500 is depicted at a high level for the sake of discussion herein. As noted above, the hash value may be applicable to different data flows such as an IP flow, a DRB, a LCG, etc. In this particular example 500, the hash values are used to associate data with a given LCG.

An AP 505, which may be similar to 505, is configured to generate a data structure 515 showing an association of one or more hash values (e.g., hash #1, hash #2, . . . , hash #n) with the amount of pending data stored in one or more buffers of the AP 505 (e.g., buffers 315/320/330/335). It will be understood that the term "pending data" at 515, 520, and 525 is an indication of an amount of data associated with a given hash value (e.g., a number of packets, or some other type of value such as number of bytes), rather than the data itself.

The data structure 515 is depicted as a two-column multi-row table for the sake of discussion herein, however it will be understood that in other embodiments the data may be arranged in some other format. Additionally, as noted, the data structure 515 may associate each hash (e.g., hash #1, hash #2, etc.) with an amount of data of an IP flow, or, in other embodiments, an amount of data of a DRB, LCG, QFI, etc.

An indication of the data structure 515 is provided by the AP 505 to a BB processor 510 (which may be similar to BB processor 410), for example as a periodic in-band communication or in some other manner as described above. The BB processor 510 may additionally have a data structure 520, which is similar to data structure 515. The data structure 520 may associate a hash value (e.g., hash #1, hash #2, . . . , hash #n) with a LCG (e.g., LCG a, LCG b, . . . , LCG z). The data structure 520 may additionally include an indication of pending data stored in buffers of the BB processor such as buffers 405, 415, or 420. Similarly to data structure 515, the indication of pending data at 520 may include a value that indicates a number of packets (or some other element of data) at the BB processor 510, rather than the data itself.

Based on the data structures 515 and 520, the BB processor 510 may be configured to generate a BSR 525. Specifically, the BB processor 510 may be configured to associate, based on the hash values of data structures 515, pending data from the AP 505 with pending data from the BB processor 510. The BB processor 510 may further associate, based on the hash, the pending data with an LCG. The BSR 525 may therefore include an indication of total pending data at the AP 505 and the BB processor 510 for a given LCG.

As a specific example, the BB processor 510 may identify, based on data structure 515, an amount of pending data from the AP 505 associated with hash #1. The BB processor 510 may further associate, based on data structure 520, the amount of pending data in buffers of the BB processor 510 related to hash #1. The BB processor 510 may add the two values related to the pending data to identify a total amount of pending data related to hash #1. The BB processor 510 may finally identify that hash #1 is associated with LCG A, and therefore the total amount of pending data related to hash #1 is related to LCG A as shown in the BSR 525.

In another embodiment, the AP 505 may not generate, or be aware of, the hash value. In this embodiment, the AP 505 may transmit, to the BB processor 510, a table that indicates the amount of pending data per QFI, per evolved packet system identifier (EPS-ID), or per network service access point identifier (NSAPI). In this embodiment, the BB processor 510 may be configured to associate an indication of the QFI, EPS-ID, NSAPI, etc. with a given DRB or LCG to generate the BSR 525.

Figure 6:
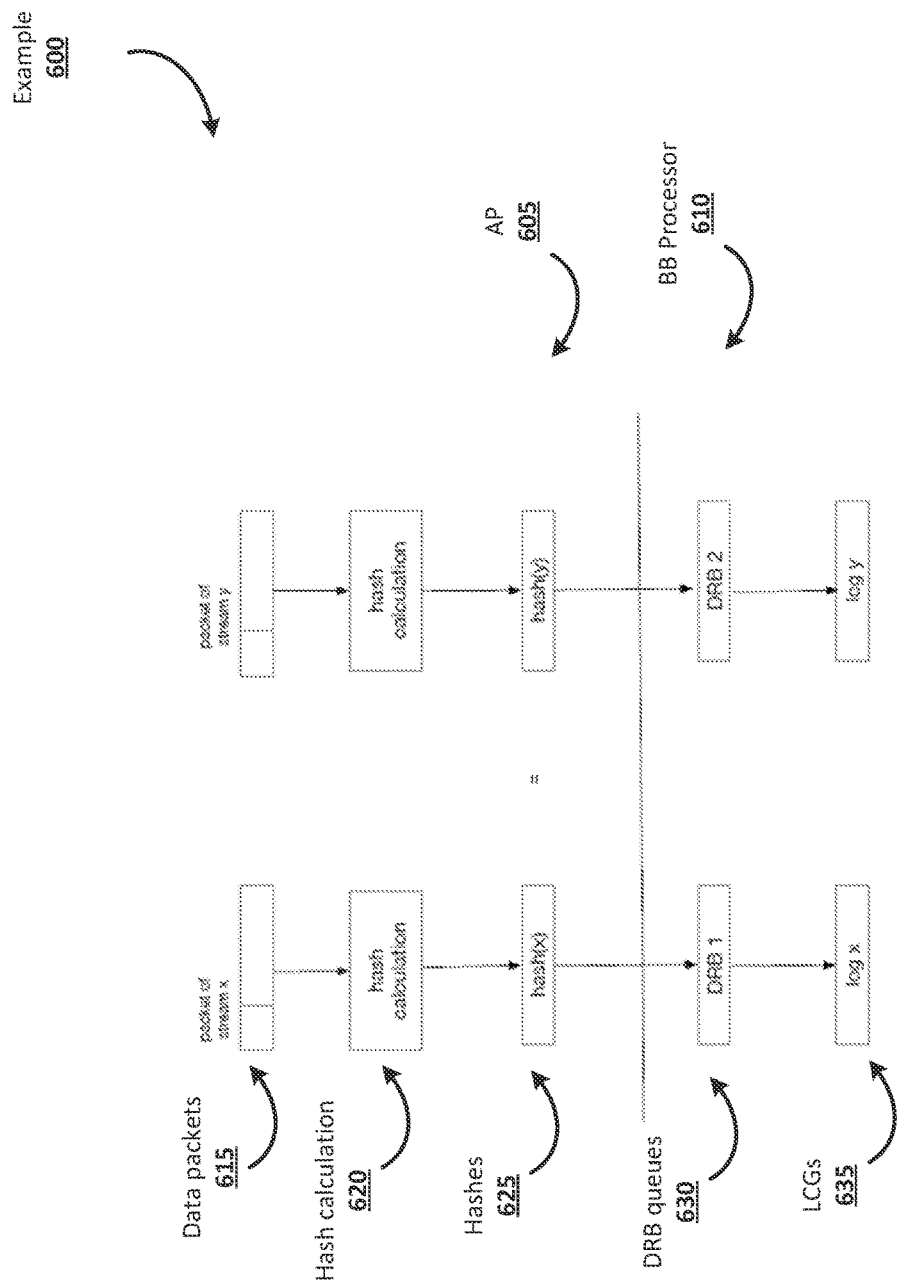
FIG. 6 illustrates an example of non-unique hash values, in accordance with various embodiments.

In some embodiments, the hash value may be generated based on the data of the structure (e.g., IP flow, DRB, LCG, etc.) with which the hash is associated. Given the amount of data used to generate the hash, in some embodiments the hashes may be non-unique such that the hashes for two different structures may be the same as one another. FIG. 6 illustrates an example 600 of non-unique hash values, in accordance with various embodiments.

The example 600 depicts two different process flows related to two different data streams (e.g., two different IP flows) (x) and (y). As shown in the example 600, elements that are above the horizontal line may be performed by an AP 605 (which may be similar to AP 305), and elements below the horizontal line may be performed by a BB processor 610 (which may be similar to BB processor 410).

As shown the AP 605 (or, more specifically, buffers thereof) include a number of packets 615 related to a first data stream (x) and a number of packets 615 related to a second data stream (y). Based on the data packets at 615, the AP 605 performs hash calculations at 620 to generate hashes 625 such as hash(x) and hash(y).

The BB processor 610 stores data related to the two different data flows in two different DRB buffers 630, specifically DRB 1 and DRB 2. The DRB buffers 630 may be similar to, for example, DRB buffers 405.

The respective hashes from 625 (e.g., hash(x) and hash(y)) may then be associated with different LCGs 635 (e.g., LCG x, which is associated with the packets of stream x at 615, and LCG y, which is associated with the packets of stream y at 615).

In this embodiment, if the hashes at 625 are identical to one another, then it may be difficult for the BB processor 610 to generate an accurate BSR for a given LCG based on the hashes. In this embodiment, the amount of data associated with a given LCG may be identified based on prior statistics of data flow at the UE. For example, if the LCG x is known to typically occupy 70% of resources, and LCG y is known to typically occupy 30% of resources, then 70% of the total data packets of streams x and y at 615 may be reported in the BSR as associated with LCG x, and 30% of the total data packets of streams x and y at 615 may be reported in the BSR as associated with LCG y.

In another embodiment, the total amount of data packets of streams x and y at 615 may be reported in the BSR as associated with both LCG x and LCG y. In this embodiment, the BSR would indicate that there was more UL data in the buffers of the UE than was accurate, and so more UL resources would be dedicated to the UE. This scenario may be desirable to avoid an under-reporting that could result in too few UL resources dedicated to the UE.

It will be understood that these embodiments are intended as example embodiments, and other techniques to resolve conflicting hashes may additionally or alternatively be used.

In another embodiment, as indicated above, the AP may perform a QoS mapping of data in buffers of the AP, such that the data of different streams can be associated with a QoS flow identifier (QFI). In this embodiment, rather than generating a hash, the AP may provide an indication of the QFI and the amount of pending data associated with the given QFI. It will be noted that, in this embodiment, similar mapping may not be required at the BB processor, and rather the BB processor may rely on the mapping performed by the AP. In other embodiments, both the BB processor and the AP may perform the described mapping.

Figure 7:
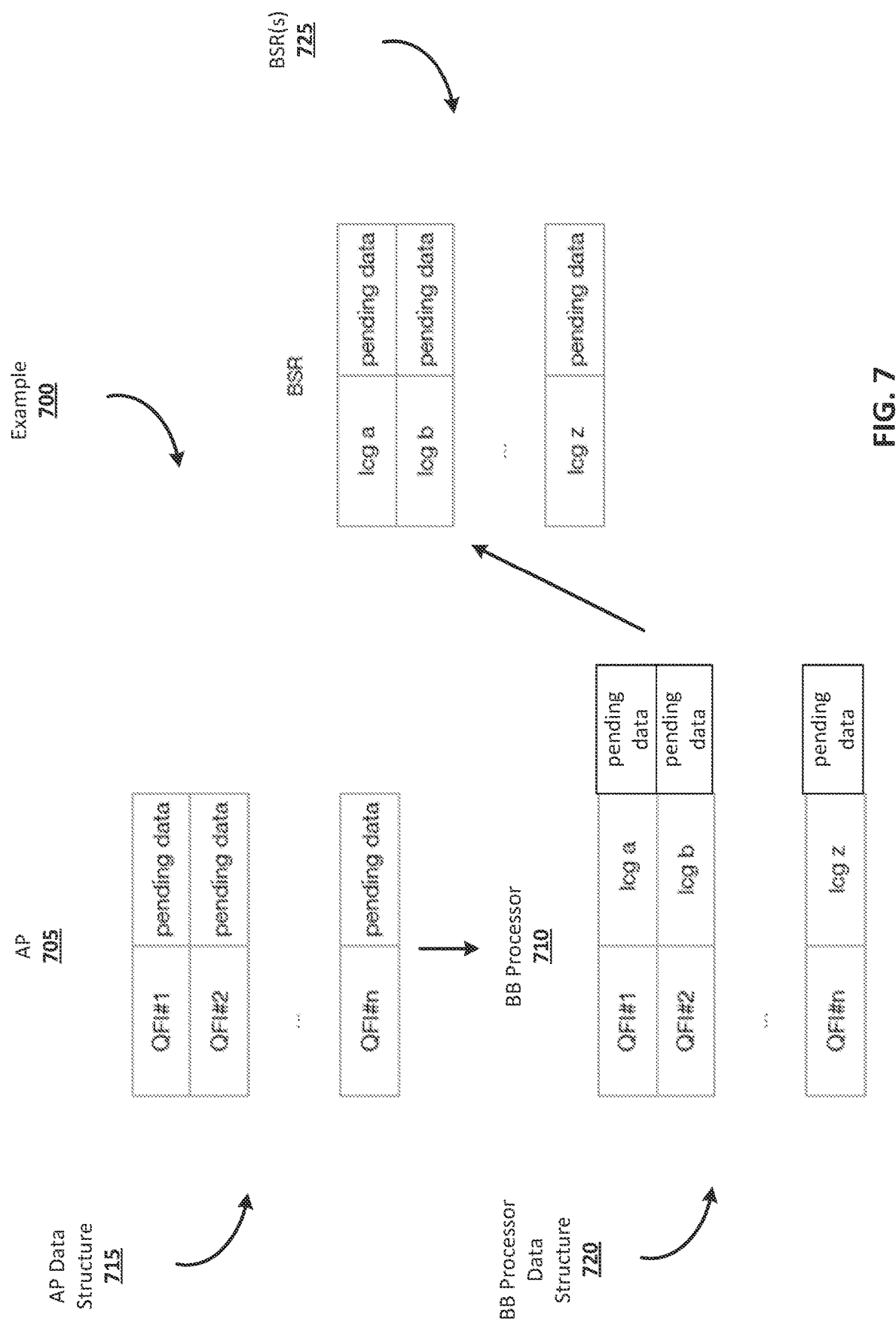
FIG. 7 illustrates a high level example of usage of a quality of service (QoS) flow identifier (QFI), in accordance with various embodiments.

FIG. 7 illustrates a high level example 700 of usage of a QoS flow identifier (QFI), in accordance with various embodiments. Generally, elements of FIG. 5 may be similar to those of FIG. 7. For example, FIG. 7 depicts an AP 705, a BB processor 710, an AP data structure 715, a BB processor data structure 720, and BSR(s) 725, which may be respectively similar to elements 505, 510, 515, 520, and 525. However, as can be seen in FIG. 7, a QFI of a data flow with which the different elements of pending data are associated is used in place of the hash values.

The embodiment of FIG. 7 may provide certain benefits over alternative techniques. For example, in this embodiment, the AP 705 and the BB processor 710 may be able to more accurately identify the data associated with a given data flow through the use of the QFI, as the QFI is directly related to the data flow itself. Additionally, the QFI may be non-unique and reusable for a given data flow, which may reduce the amount of processing time or resources necessary to generate the BSR(s) 725.

In another embodiment, for a set of packets that are sent from an AP such as AP 305 to a BB processor such as BB processor 410, the AP may amend the per-packet metadata information (e.g., the packet descriptor) to provide an indication of pending AP-side data for that particular IP flow. In some embodiments, this metadata may be part of the metadata of each packet in the IP flow, while in other embodiments this metadata may only be included in the last packet of a group of packets sent from the AP to the BB processor. Based on this indication, the BB processor may then be configured to generate one or more BSRs related to the IP flow.

In another embodiment, it may be assumed that the AP will be "awake" (e.g., not in an idle state) during a data transfer from the AP to the BB processor. Therefore, the BB may periodically (e.g., every 10 ms or on some other time scale dependent on total data traffic or bandwidth of the UE) request that the AP provide an indication of the pending data per IP flow (or per other structural unit such as per LCG, per DRB, etc.). In this embodiment, the request to the AP, or the transmission of the indication of the AP, may occur either in-band or out-of-band (e.g., through a control plane level communication). In some embodiments, this technique may have an inherent latency, and incur delays in data transfer between approximately 30 ms and 70 ms. However, this technique may be a reasonable secondary technique in the event of failure of a primary technique such as the use of a hash value or some other technique described herein.

In another embodiment, the AP may periodically transmit one or more control PDUs to the BB processor. The control PDUs may include an indication of an amount of pending data per buffer or per PDU session that is on the AP and which is not yet enqueued in one or more of the AP buffers. The AP may additionally provide an indication (e.g., a byte count value, a packet count value, etc) of how much data is enqueued in one or more buffers of the AP. The AP may further provide an indication such as an index of a first or last packet in each buffer so that the BB processor may update a count of the amount of data in each queue. In some embodiments, each of these indications may be provided in separate control PDUs, while in other embodiments a single PDU may include one or more of the indicated values. As noted, the control PDU(s) may be sent periodically, e.g. every 10 ms or in accordance with some other time interval as discussed above.

In another embodiment, the BSR may be based on identification of an application with which a given amount of data (e.g., a given DBR, IP flow, LCG, etc.) is associated. In this embodiment, a BSR may be preconfigured, such that different applications have different UL resource requirements that can be requested in a BSR. As one example, when a UE is performing a system update, it may be expected that such a process will require a relatively large amount of data. As such, the UE may generate a BSR that indicates a need for a relatively high amount of UL resources. By contrast, a text message application may be associated with much less data, and so the UE may generate a BSR related to the text message application the indicates a need for a relatively low amount of resources.

In this embodiment, identification of the application may be performed by an AP. In this embodiment, the AP may provide an indication of the application to the BB processor when data is transmitted from a buffer of the AP to the BB processor. Such an indication may be provided in metadata of the data, or in some other format. The BB processor may then be configured to identify, for example from a stored table or some other data structure, a BSR that is to be reported based on the indicated application. In another embodiment, the AP may perform the identification of the BSR based on the application, and provide an indication of the BSR to the BB processor.

In another embodiment, the AP may report a total amount of data in one or more buffers of the AP to the BB processor. In some embodiments, the data may be all data in the AP, all data related to a given packet data network (PDN), all data related to a give LCG, etc. In some embodiments, the data reported by the AP to the BB processor may span multiple DRBs.

In this embodiment, it may be assumed that each DRB in the BB processor will have its own UL buffer. The data reported by the AP for a given DRB may be proportionally split based on the proportion of total data in the BB processor buffers associated with that DRB.

As a particular example, assume that the AP has one UL buffer per PDN, and each PDN is related to three DRBs (and, correspondingly, three DRB buffers) in the BB processor. The BB processor may be configured to identify that a first DRB buffer (DRB1) is currently queueing 2000 bytes. Similarly, a second DRB buffer (DRB2) is currently queueing 3000 bytes. Finally, a third DRB buffer (DRB3) is currently queueing 5000 bytes. As a result, the total amount of bytes being queued in the BB processor for the PDN is 10000 bytes.

The BB processor may therefore identify that DRB1 is holding 20% of the queued data of the PDN (e.g., 2000 bytes of the total 10000 bytes of the PDN), DRB2 is holding 30% of the queued data of the PDN (e.g, 3000 bytes of the total 10000 bytes of the PDN), and DRB3 is holding 50% of the queued data of the PDN (eg., 5000 bytes of the total 10000 bytes of the PDN).

In this embodiment, further assume that the AP has indicated, for example in an in-band report, and out-of-band report, or some other reporting mechanism, that it is queueing 6000 bytes for the same PDN. The BB processor may be configured to apply similar proportions to the data of the AP as were identified for the data at the BB processor. Specifically, the BB processor may identify that 1200 bytes of the 6000 bytes (e.g., 6000*20%) is associated with DRB1, 1800 bytes of the 6000 bytes (e.g., 6000*30%) is associated with DRB2, and 3000 bytes of the 6000 bytes (e.g., 50%*6000) is associated with DRB3.

Based on the above, the BB processor may identify that the total queued data for DRB1 is 2000+1200=3200 bytes, the total queued data for DRB2 is 1800+3000=4800 bytes, and the total queued data for DRB3 is 3000+5000=8000 bytes. The BB processor may generate one or more BSRs accordingly.

As a general abstraction, the reported amount of data for DRB k for a BSR calculation, $x_k$, may be equal to $m_k*(1 \text{ n/sum}(m_1, \ldots, m_p))$ where p represents the number of available DRBs, n represents the pending amount of data in the AP in bytes, and $m_k$ represents the amount of data in the BB processor related to DRB k in bytes.

It will be recognized that the above-described options and embodiments are intended as non-exclusive example embodiments. Some embodiments may use two or more of the above-described techniques, while other embodiments may only use one of the above-described techniques.

Figure 8:
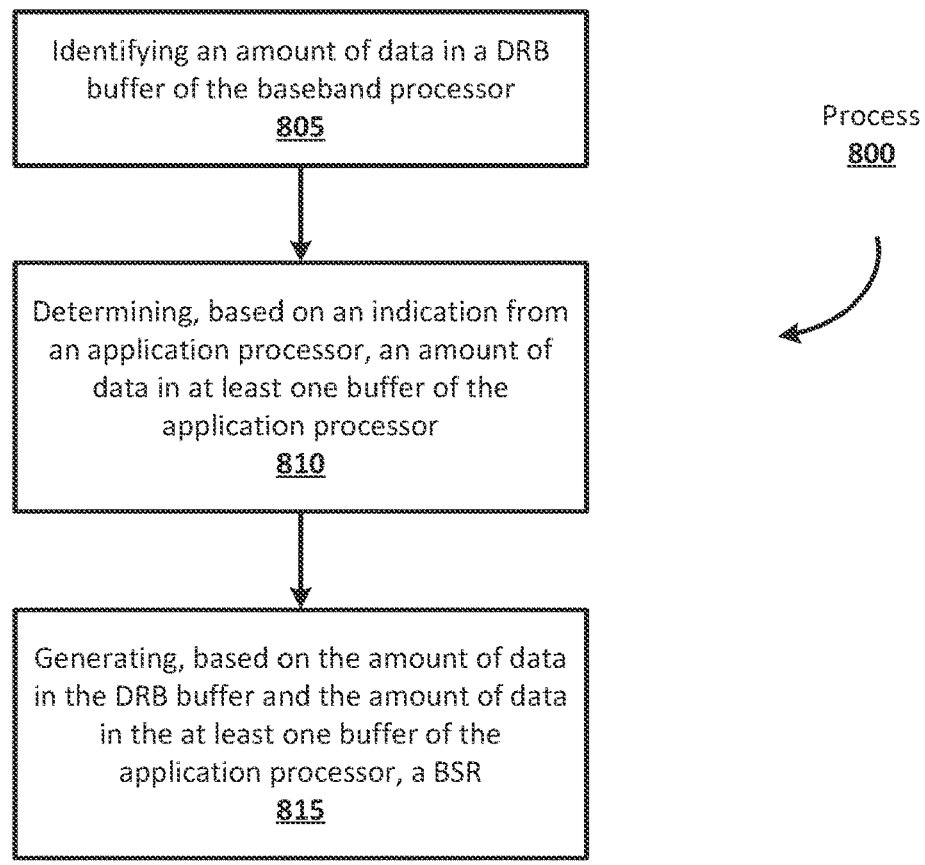
FIG. 8 illustrates an example process to be performed by a baseband processor, in accordance with various embodiments.

FIG. 8 illustrates an example process 800 to be performed by a BB processor, in accordance with various embodiments. In embodiments, the process 800 may be performed by a BB processor such as BB processor 410, or some other BB processor.

The process 800 may include identifying, at 805, an amount of data in a DRB buffer of the baseband processor. For example, the BB processor may identify the amount of data in one or more of the DRB buffers 405 of FIG. 4. In some embodiments, the data may be related to a LCG, an IP flow, an application, etc.

The process 800 may further include determining, at 810 based on an indication from an AP such as AP 305, an amount of data in at least one buffer of the AP. Such an indication may be or include one or more of the indications described above such as an in-band indication, an out-of-band indication, a control PDU, a hash, a QFI, an identification of an application to which the data is related, a status request response, etc.

The process 800 may further include generating, at 815 based on the amount of data in the DRB buffer and the amount of data in the at least one buffer of the AP, a BSR. Such a BSR may be similar to one or more of BSRs 525, 725, or some other BSR described above.

Figure 9:
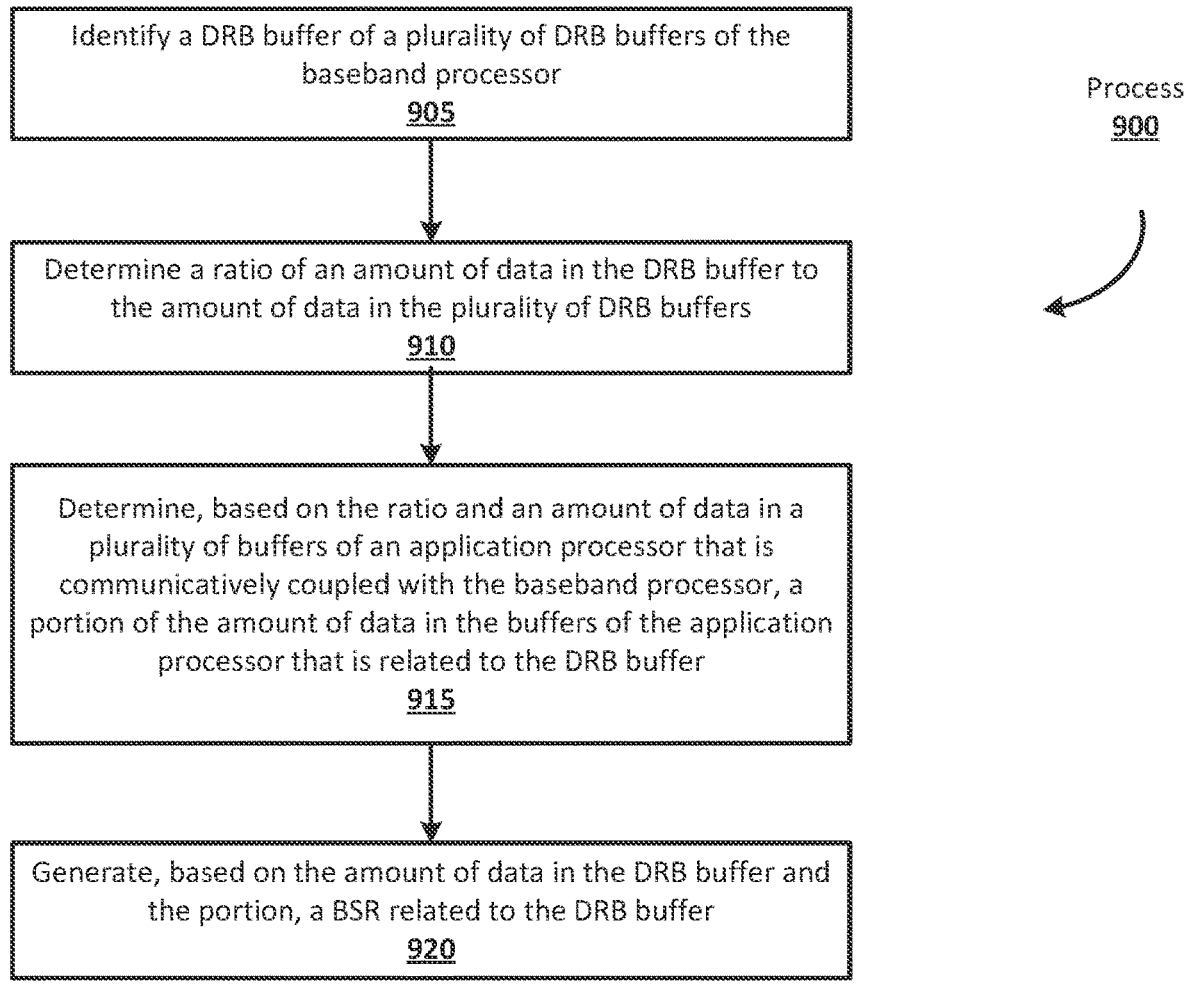
FIG. 9 illustrates an alternative example process to be performed by a baseband processor, in accordance with various embodiments.

FIG. 9 illustrates an alternative example process 900 to be performed by a BB processor such as BB processor 410, in accordance with various embodiments.

The process 900 may include identifying, at 905, a DRB buffer (e.g., DRB1) of a plurality of DRB buffers (e.g., DRB1, DRB2, and DRB3) of the baseband processor. The process 900 may further include determining, at 910, a ratio of an amount of data in the DRB buffer to the amount of data in the plurality of DRB buffers. For example, the BB processor may identify that DRB1 has 20% of the total 10000 bytes of data, or 2000 bytes, currently enqueued by the BB processor.

The process 900 may further include determining, at 915 based on the ratio and an amount of data in a plurality of buffers of an AP that is communicatively coupled with the BB processor (e.g., AP 305), a portion of the amount of data in the buffers of the AP that is related to the DRB buffer. For example, as described above, the BB processor may identify that the AP has 6000 bytes currently enqueued. Therefore, the BB processor may identify that the portion of enqueued data related to DRB1 is 20% of the 6000 bytes=1200 bytes.

The process 900 may further include generating, at 920 based on the amount of data in the DRB buffer (e.g., the 2000 bytes identified at element 910) and the portion (e.g., the 1200 bytes identified at element 915) a BSR related to the DRB buffer.

It will be understood that the above-described embodiments are intended as example embodiments, and other embodiments may vary. For example, other embodiments may have more or fewer elements than depicted in FIG. 8 or 9, elements performed in a different order than depicted or concurrently with one another, or some other variation.

Figure 10:
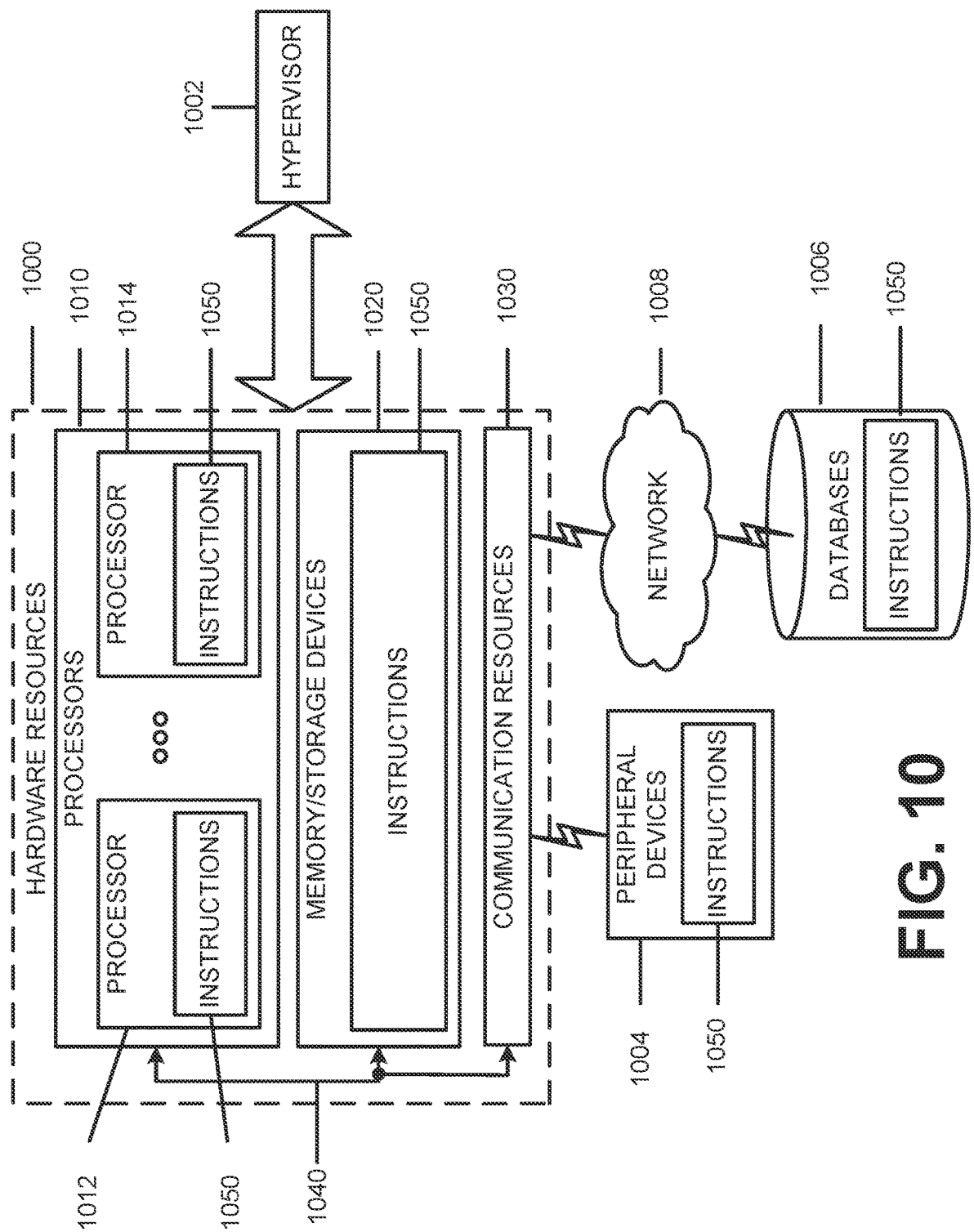
FIG. 10 is a high level example of an electronic device, in accordance with various embodiments.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000. In some embodiments, the hardware resources 1000 may be, be part of, implement, be implemented by, or otherwise be related to either or both of electronic devices 100 and 200.

The processors 1010 may include, for example, a processor 1012 and a processor 1014. The processor(s) 1010 may be, for example, a central processing unit (CPU), a RISC processor, a CISC processor, a GPU, a DSP such as a baseband processor, an ASIC, an FPGA, a RFIC, another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as DRAM, SRAM, EPROM, EEPROM, flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein, including at least processes 800 and 900 described with respect to FIGS. 8 and 9, for example. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Examples of various embodiments may include one or more of the following:

Example 1 includes a method to be performed by a baseband processor of an electronic device, wherein the method includes: identifying, by the baseband processor, an amount of data in a data radio bearer (DRB) buffer of the baseband processor; determining, by the baseband processor based on an indication from an application processor of the electronic device, an amount of data in at least one buffer of the application processor; and generating, by the baseband processor based at least in part on the amount of data in the DRB buffer and the amount of data in the at least one buffer of the application processor, a buffer status report (BSR).

Example 2 includes the method of example 1, or some other example herein, wherein the indication is related to a hash that is based at least in part data of the application processor that is related to an internet protocol (IP) flow.

Example 3 includes the method of example 2, or some other example herein, wherein the hash is related to a logical channel group (LCG) of data.

Example 4 includes the method of example 1, or some other example herein, wherein the indication is related to a quality of service (QoS) flow identifier (QFI) that is based at least in part on the amount of data in the at least one buffer of the application processor.

Example 5 includes the method of example 1, or some other example herein, wherein the indication is related to a number of packets or a number of bytes that are in an internet protocol (IP) flow that is to be transmitted from the application processor to the baseband processor.

Example 6 includes the method of example 1, or some other example herein, wherein the indication is based at least in part on a status request that was previously transmitted from the baseband processor to the application processor.

Example 7 includes the method of example 1, or some other example herein, wherein the indication is a control packet data unit (PDU) that is related to a PDU session of the application processor.

Example 8 includes the method of example 1, or some other example herein, wherein the method further includes: identifying, by the baseband processor, an application that is related to the amount of data in the DRB buffer and the amount of data in the at least one buffer of the application processor; identifying, by the baseband processor based at least in part on pre-identified stored data and the application, a pre-determined BSR related to the application; and generating, by the baseband processor based at least in part on the pre-determined BSR, the BSR.

Example 9 includes the method of example 1, or some other example herein, wherein the method further includes determining, by the baseband processor based on the indication, an amount of data in a plurality of buffers of the application processor; determining, by the baseband processor, a percentage of the amount of data in the DRB buffer of the baseband processor to an amount of data in a plurality of DRB buffers of the baseband processor; determining, by the baseband processor based at least in part on the percentage and the amount of data in the plurality of buffers of the application processor, an amount of data in a buffer of the plurality of buffers of the application processor; and generating, by the baseband processor based at least in part on the amount of data in the buffer of the plurality of buffers of the application processor and the amount of data in the DRB buffer of the baseband processor, the BSR.

Example 10. An apparatus that includes: an application processor; a baseband processor communicatively coupled with the application processor; and one or more non-transitory computer-readable media that includes instructions that, upon execution of the instructions by the baseband processor, are to cause the baseband processor to: identify an amount of data in a data radio bearer (DRB) buffer of the baseband processor; identify, in a transmission from an application processor of the electronic device, an indication of an amount of data in at least one buffer of the application processor; and generate, based at least in part on the amount of data in the DRB buffer and the amount of data in the at least one buffer of the application processor, a buffer status report (BSR).

Example 11 includes the apparatus of example 10, or some other example herein, wherein the indication is related to a hash that is based at least in part on an internet protocol (IP) flow of at least one buffer of the application processor.

Example 12 includes the apparatus of example 11, or some other example herein, wherein the hash is related to an internet protocol (IP) flow that includes the data in the DRB buffer and the data in the at least one buffer of the application processor.

Example 13 includes the apparatus of example 11, or some other example herein, wherein the hash is related to a media access control (MAC) logical channel group (LCG) of an uplink transmission that is to be transmitted by the apparatus.

Example 14 includes the apparatus of example 13, or some other example herein, wherein the LCG is a first LCG, and wherein the instructions are further to: identify that the hash is further related to a second LCG of the uplink transmission; identify a portion of the amount of data in the DRB buffer; identify a portion of the amount of data in the at least one buffer of the application processor; and generate the BSR based at least in part on the portion of the amount of data in the DRB buffer and the portion of the amount of data in the at least one buffer of the application processor, wherein the BSR is related to the first LCG.

Example 15 includes the apparatus of example 13, or some other example herein, wherein the LCG is a first LCG, and wherein the instructions are further to: identify that the hash is further related to a second LCG of the uplink transmission; generate the BSR; and associate the BSR with the first and the second LCGs.

Example 16 includes the apparatus of example 10, or some other example herein, wherein the indication is received in an in-band periodic command that is transmitted from the application processor to the baseband processor.

Example 17 includes one or more non-transitory computer-readable media that include instructions that, upon execution of the instructions by a baseband processor, are to cause the baseband processor to: identify a data radio bearer (DRB) buffer of a plurality of DRB buffers of the baseband processor; determine a ratio of an amount of data in the DRB buffer to the amount of data in the plurality of DRB buffers; determine, based at least in part on the ratio and an amount of data in a plurality of buffers of an application processor that is communicatively coupled with the baseband processor, a portion of the amount of data in the buffers of the application processor that is related to the DRB buffer; and generate, based at least in part on the amount of data in the DRB buffer and the portion, a buffer status report (BSR) related to the DRB buffer.

Example 18 includes the one or more non-transitory computer-readable media of example 17, or some other example herein, wherein the ratio is a percentage.

Example 19 includes the one or more non-transitory computer-readable media of example 17, or some other example herein, wherein the BSR is related to the IP flow.

Example 20 includes the one or more non-transitory computer-readable media of example 17, or some other example herein, wherein the BSR is a BSR of a plurality of BSRs, wherein respective BSRs of the plurality of BSRs are related to different IP flows.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A method to be performed by a baseband processor of a user equipment (UE), wherein the method comprises:
identifying, by the baseband processor of the UE, an amount of data in a data radio bearer (DRB) buffer of the baseband processor of the UE;
determining, by the baseband processor of the UE based on an indication from an application processor of the UE, an amount of data in at least one buffer of the application processor of the UE; and
generating, by the baseband processor of the UE based at least in part on the amount of data in the DRB buffer and the amount of data in the at least one buffer of the application processor of the UE, a buffer status report (BSR) for the UE.

2. The method of claim 1, wherein the indication is related to a hash that is based at least in part on data of the application processor that is related to an internet protocol (IP) flow.

3. The method of claim 2, wherein the hash is related to a logical channel group (LCG) of data.

4. The method of claim 1, wherein the indication is related to a quality of service (QoS) flow identifier (QFI) that is based at least in part on the amount of data in the at least one buffer of the application processor.

5. The method of claim 1, wherein the indication is related to a number of packets or a number of bytes that are in an internet protocol (IP) flow that is to be transmitted from the application processor to the baseband processor.

6. The method of claim 1, wherein the indication is based at least in part on a status request that was previously transmitted from the baseband processor to the application processor.

7. The method of claim 1, wherein the indication is a control packet data unit (PDU) that is related to a PDU session of the application processor.

8. The method of claim 1, further comprising:
identifying, by the baseband processor, an application that is related to the amount of data in the DRB buffer and the amount of data in the at least one buffer of the application processor;
identifying, by the baseband processor based at least in part on pre-identified stored data and the application, a pre-determined BSR related to the application; and
generating, by the baseband processor based at least in part on the pre-determined BSR, the BSR.

9. The method of claim 1, further comprising:
determining, by the baseband processor based on the indication, an amount of data in a plurality of buffers of the application processor;
determining, by the baseband processor, a percentage of the amount of data in the DRB buffer of the baseband processor to an amount of data in a plurality of DRB buffers of the baseband processor;
determining, by the baseband processor based at least in part on the percentage and the amount of data in the plurality of buffers of the application processor, an amount of data in a buffer of the plurality of buffers of the application processor; and
generating, by the baseband processor based at least in part on the amount of data in the buffer of the plurality of buffers of the application processor and the amount of data in the DRB buffer of the baseband processor, the BSR.

10. An apparatus comprising:
an application processor of a user equipment (UE);
a baseband processor of the UE communicatively coupled with the application processor; and
one or more non-transitory computer-readable media comprising instructions that, upon execution of the instructions by the baseband processor of the UE, are to cause the baseband processor of the UE to:
identify an amount of data in a data radio bearer (DRB) buffer of the baseband processor of the UE;
identify, in a transmission from the application processor of the UE, an indication of an amount of data in at least one buffer of the application processor of the UE; and
generate, based at least in part on the amount of data in the DRB buffer and the amount of data in the at least one buffer of the application processor of the UE, a buffer status report (BSR) for the UE.

11. The apparatus of claim 10, wherein the indication is related to a hash that is based at least in part on an internet protocol (IP) flow of at least one buffer of the application processor.

12. The apparatus of claim 11, wherein the hash is related to an internet protocol (IP) flow that includes the data in the DRB buffer and the data in the at least one buffer of the application processor.

13. The apparatus of claim 11, wherein the hash is related to a media access control (MAC) logical channel group (LCG) of an uplink transmission that is to be transmitted by the apparatus.

14. The apparatus of claim 13, wherein the LCG is a first LCG, and wherein the instructions are further to:
identify that the hash is further related to a second LCG of the uplink transmission;
identify a portion of the amount of data in the DRB buffer;
identify a portion of the amount of data in the at least one buffer of the application processor; and
generate the BSR based at least in part on the portion of the amount of data in the DRB buffer and the portion of the amount of data in the at least one buffer of the application processor, wherein the BSR is related to the first LCG.

15. The apparatus of claim 13, wherein the LCG is a first LCG, and wherein the instructions are further to:
identify that the hash is further related to a second LCG of the uplink transmission;
generate the BSR; and
associate the BSR with the first and the second LCGs.

16. The apparatus of claim 10, wherein the indication is received in an in-band periodic command that is transmitted from the application processor to the baseband processor.

17. The method of claim 1, wherein the indication comprises control plane elements for transmissions by the UE.

18. The method of claim 1, wherein determining the amount of data in the at least one buffer of the application processor of the UE comprises determining the amount of data in the at least one buffer of the application processor of the UE that is larger than and buffers data for the DRB buffer of the baseband processor of the UE.

19. The method of claim 1, wherein generating the BSR comprises generating the BSR that includes data for uplink data pending at the UE in the DRB buffer of the baseband processor of the UE and the at least one buffer of the application processor of the UE.

20. An apparatus comprising one or more baseband processors of a user equipment (UE) configured to perform operations comprising:
identifying an amount of data in a data radio bearer (DRB) buffer of a baseband processor of the UE and from the one or more baseband processors;
determining, based on an indication from an application processor of the UE, an amount of data in at least one buffer of the application processor of the UE; and
generating, based at least in part on the amount of data in the DRB buffer and the amount of data in the at least one buffer of the application processor of the UE, a buffer status report (BSR) for the UE.

* * * * *

UNITED STATES PATENT AND TRADEMARK OFFICE
CERTIFICATE OF CORRECTION

| | |
|---|---|
| PATENT NO. | : 11,985,539 B2 |
| APPLICATION NO. | : 17/390822 |
| DATED | : May 14, 2024 |
| INVENTOR(S) | : Vijay Venkataraman et al. |

It is certified that error appears in the above-identified patent and that said Letters Patent is hereby corrected as shown below:

On the Title Page

Item (72), "Inventors:", Line 3, replace "Walperskirchen (DE);" with -- Walpertskirchen (DE); --.

Signed and Sealed this
Second Day of July, 2024

Katherine Kelly Vidal
*Director of the United States Patent and Trademark Office*